US00RE50580E

(19) United States
(12) Reissued Patent
Lee et al.

(10) Patent Number: US RE50,580 E
(45) Date of Reissued Patent: Sep. 2, 2025

(54) APPARATUS AND METHOD FOR CONSTITUTING CONTROL INFORMATION FOR A MULTI-CAST BROADCAST SERVICE

(71) Applicant: Electronics and Telecommunications Research Institute, Daejeon (KR)

(72) Inventors: Kook Jin Lee, Seoul (KR); Jae Heung Kim, Daejeon (KR)

(73) Assignee: Electronics and Telecommunications Research Institute, Daejeon (KR)

(21) Appl. No.: 15/343,189

(22) Filed: Nov. 3, 2016

Related U.S. Patent Documents

Reissue of:
(64) Patent No.: 8,879,489
Issued: Nov. 4, 2014
Appl. No.: 13/501,862
PCT Filed: Oct. 13, 2010
PCT No.: PCT/KR2010/006996
§ 371 (c)(1),
(2) Date: Jun. 25, 2012
PCT Pub. No.: WO2011/046362
PCT Pub. Date: Apr. 21, 2011

(30) Foreign Application Priority Data

Oct. 13, 2009 (KR) ..... 10-2009-0097191
Oct. 26, 2009 (KR) ..... 10-2009-0101719
Oct. 29, 2009 (KR) ..... 10-2009-0103408

(51) Int. Cl.
*H04W 4/00* (2018.01)
*H04W 72/12* (2023.01)
(Continued)

(52) U.S. Cl.
CPC ..... *H04W 72/30* (2023.01); *H04W 72/12* (2013.01); *H04W 72/1273* (2013.01);
(Continued)

(58) Field of Classification Search
CPC ..... H04W 72/005; H04W 72/1278; H04W 72/1289; H04W 72/1273; H04W 72/12;
(Continued)

(56) References Cited

U.S. PATENT DOCUMENTS 8,797,939 B2 * 8/2014 Al ..... H04W 72/005 370/312
9,031,569 B2 * 5/2015 Kwon ..... H04W 48/18 370/312
(Continued)

FOREIGN PATENT DOCUMENTS

EP 2051410 A1 4/2009
KR 1020050017580 2/2005
(Continued)

OTHER PUBLICATIONS

Samsung, "Further MSAP signaling details," 3GPP TSG-RAN2#67 bis meeting, R2-095892, 3 pages (2009).
(Continued)

*Primary Examiner* — Adam L Basehoar
(74) *Attorney, Agent, or Firm* — Insight Law Group, PLLC; Seung Lee

(57) ABSTRACT

The present invention relates to an apparatus and a method for constituting control information for at least one subframe allocation pattern for a multi-cast broadcast service. The method compares periods of radio frame units for each of subframe allocation patterns, sets up a unit period in which at least one subframe allocation pattern is repeated, and sets up control information containing subframe information allocated for a multi-cast broadcast service in the unit period set in the previous step. The method of the present invention enables, for example, efficient separation of MBSFN subframe for an MBMS from other MBSFN subframes.

16 Claims, 6 Drawing Sheets

(51) Int. Cl.

| | |
|---|---|
| ***H04W 72/1273*** | (2023.01) |
| ***H04W 72/20*** | (2023.01) |
| ***H04W 72/23*** | (2023.01) |
| ***H04W 72/30*** | (2023.01) |
| *H04W 76/40* | (2018.01) |
| *H04W 88/04* | (2009.01) |

(52) U.S. Cl.
CPC ..... *H04W 72/20* (2023.01); *H04W 72/23* (2023.01); *H04W 76/40* (2018.02); *H04W 88/04* (2013.01)

(58) Field of Classification Search
CPC ... H04W 76/40; H04W 88/04; H04W 72/042; H04W 72/0406
USPC ..... 370/329
See application file for complete search history.

(56) References Cited

U.S. PATENT DOCUMENTS

2005/0037768 A1 2/2005 Hwang et al.
2005/0041681 A1* 2/2005 Lee ..... H04W 72/1289 370/437
2006/0030342 A1 2/2006 Hwang et al.
2009/0046617 A1* 2/2009 Tenny ..... H04L 5/0064 370/312
2009/0207774 A1* 8/2009 Lee et al. ..... 370/312
2010/0234034 A1* 9/2010 Aoyama et al. ..... 455/450
2010/0279721 A1* 11/2010 Chen ..... H04L 67/325 455/466
2010/0309835 A1* 12/2010 Kuo ..... H04W 72/005 370/312
2010/0322135 A1* 12/2010 Van Lieshout ..... H04W 72/005 370/312
2010/0322154 A1* 12/2010 Chen ..... H04W 99/00 370/328
2010/0329171 A1* 12/2010 Kuo et al. ..... 370/312
2011/0013554 A1* 1/2011 Koskinen ..... 370/315
2011/0188436 A1* 8/2011 Damnjanovic et al. ..... 370/312
2011/0194428 A1* 8/2011 Wang ..... H04W 72/005 370/252
2011/0194477 A1* 8/2011 Damnjanovic et al. ..... 370/312
2011/0211519 A1* 9/2011 Katayama ..... H04W 72/30 370/312
2011/0222459 A1* 9/2011 Kim ..... 370/312
2011/0243054 A1* 10/2011 Yi et al. ..... 370/312
2012/0039236 A1* 2/2012 Lv ..... H04L 27/2602 370/312
2012/0076064 A1* 3/2012 Ma ..... H04W 72/005 370/312
2012/0269108 A1* 10/2012 Zhai ..... H04W 72/30 370/312
2014/0376438 A1* 12/2014 Damnjanovic ..... H04W 72/005 370/312

FOREIGN PATENT DOCUMENTS

KR 1020050101006 10/2005
KR 10-0705040 4/2007

OTHER PUBLICATIONS

Alcatel-Lucent et al., "MBSFN signaling issues," 3GPP TSG-RAN#61, R2-081367, 2 pages, (2008).
Samsung, "Further eMBMS control plane details," 3GPP TSG-RAN#66b, meeting, Tdoc R2-093833, 4 pages, (2009).
Samsung, "Baseline CR capturing eMBMS agreements," 3GPP TSG-RAN2#67 bis meeting, R2-095891, 16 pages (2009).

* cited by examiner

APPARATUS AND METHOD FOR CONSTITUTING CONTROL INFORMATION FOR A MULTI-CAST BROADCAST SERVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue application of U.S. Pat. No. 8,879,489 issued Nov. 4, 2014, which is issued from U.S. patent application Ser. No. 13/501,862, filed on Jun. 25, 2012, which* is a 35 U.S.C. § 371 filing of International Application Number PCT/KR2010/006996 which was filed on Oct. 13, 2010, which claims priority to, and the benefit of, Korean Application Nos. 10-2009-0097191, filed on Oct. 13, 2009, 10-2009-0101719, filed on Oct. 26, 2009; and 10-2009-0103408 filed on Oct. 29, 2009. The contents of the aforementioned application are hereby incorporated herein by reference.

TECHNICAL FIELD

Example embodiments of the present invention relate in general to a method of configuring control information for wireless communication, and more specifically to an apparatus and method for configuring control information for a multimedia broadcast/multicast service (MBMS).

BACKGROUND ART

A third generation partnership project (3GPP) long term evolution (LTE) mobile communication system currently being standardized is a next-generation communication system evolved to provide a variety of high-speed data services via a packet-based mobile communication network. For example, a 3GPP LTE mobile communication system provides a voice service, a packet data service, and also an MBMS which transmits multimedia content via a mobile communication network by broadcasting or multicasting.

A service of broadcasting or multicasting the same data to one or a plurality of cells is referred to as an MBMS or a multicast and broadcast service (MBS). The MBMS transmits multimedia via a wireless network by broadcasting or multicasting, and thus can be provided to a plurality of users using few radio resources. In an LTE system, radio resources can be allocated to an MBMS in the time and frequency domains using orthogonal frequency division multiple access (OFDMA) as a multiple access scheme.

DISCLOSURE

Technical Problem

In a current LTE system, an MBMS is transmitted using a multicast broadcast single frequency network (MBSFN) subframe. Here, such an MBSFN subframe may be used for a purpose other than an MBMS, such as relaying or positioning. Thus, it is necessary to effectively distinguish MBSFN subframes to be used for an MBMS.

Technical Solution

Accordingly, example embodiments of the present invention are provided to substantially obviate one or more problems due to limitations and disadvantages of the related art.

Example embodiments of the present invention provide a control information configuring apparatus and method enabling a multicast broadcast single frequency network (MBSFN) subframe to be used for multimedia broadcast/multicast service (MBMS) transmission to be efficiently distinguished from MBSFN subframes determined in system information block type 2 (SIB2) information.

In some example embodiments, a method of configuring control information for at least one subframe allocation pattern (SAP) for an MBMS includes: comparing periods of respective SAPs in radio frame (RF) units, and setting a unit section in which the at least one SAP is repeated; and configuring control information including information about a subframe allocated for the MBMS in the set unit section.

The control information may be configured in the form of a bitmap, and the bitmap may include allocation information for all subframes in the set unit section.

Also, the bitmap may be configured as a series of pieces of information about resource allocation for the MBMS in RF units and subframe units.

The control information may include: an upper bitmap including information about a subframe allocated for MBSFN in the set unit section; and a lower bitmap including information about the subframe allocated for the MBMS in the upper bitmap.

The unit section in which the at least one SAP is repeated may be set to correspond to the least common multiple of all period values of the at least one SAP. When an SAP is repeated in the unit section set to correspond to the least common multiple of all the period values of the at least one SAP, the unit section in which the at least one SAP is repeated may be set as a minimum section in which the SAP is repeated.

In other example embodiments, a method of configuring control information for radio resource allocation having an allocation pattern repeated at predetermined periods includes: setting a unit section in which at least one radio resource allocation pattern is repeated; when the set unit section includes sub-unit sections sharing a predetermined allocation pattern, separating the unit section into the respective sub-unit sections; and configuring control information including radio resource allocation information about the unit section and the sub-unit sections.

The control information may have a hierarchical structure including information about a type of the sub-unit sections and information about allocation patterns of the respective sub-unit sections.

The control information may also include: common resource allocation control information about resources allocated in common to one or more multicast channels (MCHs) in the set unit section; and allocation control information about the respective MCHs.

The allocation control information about the respective MCHs may be set using end positions of radio resources allocated to the respective MCHs.

In still other example embodiments, an apparatus comprising a controller for configuring control information for at least one SAP for an MBMS compares periods of respective SAPs in RF units, sets a unit section in which the at least one SAP is repeated, and configures control information including information about a subframe allocated for the MBMS in the set unit section.

In yet other example embodiments, an apparatus comprising a controller for configuring control information for radio resource allocation having an allocation pattern repeated at predetermined periods sets a unit section in which at least one radio resource allocation pattern is repeated, separates the set unit section into respective sub-unit sections when the unit section includes the sub-unit sections sharing a predetermined allocation pattern, and configures control information including radio resource allocation information about the unit section and the sub-unit sections.

Here, the apparatus for configuring control information may be a base station or a multi-cell/multicast coordination entity (MCE).

DESCRIPTION OF DRAWINGS

Example embodiments of the present invention will become more apparent by describing in detail example embodiments of the present invention with reference to the accompanying drawings, in which.

MODES OF THE INVENTION

Figure 1:
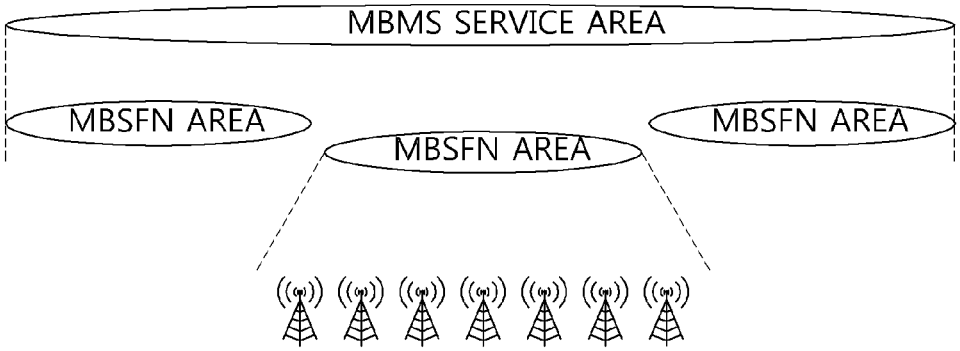
FIG. 1 illustrates a wireless communication system supporting a multimedia broadcast/multicast service (MBMS) to which example embodiments of the present invention are applied.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a wireless communication system supporting a multimedia broadcast/multicast service (MBMS) to which example embodiments of the present invention are applied.

Among techniques supporting an MBMS, a technique for transmitting synchronized common signals from a plurality of cells for a predetermined time period is referred to as a multicast broadcast single frequency network (MBSFN) technique.

When the MBSFN technique is applied, mobile communication nodes (or cells) present in a predetermined area simultaneously transmit multicast/broadcast traffic or control data using the same radio resources. An MBSFN area in which MBSFN transmission is performed consists of one cell or a plurality of cells. One or a plurality of MBSFN areas are included in an MBSFN synchronization area, enabling synchronized transmission in a physical layer. Third generation partnership project (3GPP) long term evolution (LTE) systems, Institute of Electrical and Electronics Engineers (IEEE) 802.16m, etc. support MBSFN transmission for an MBMS.

Meanwhile, MBMS traffic for an MBMS is transmitted through a multicast channel (MCH; a transport layer), and such an MCH in the transport layer is mapped to a multicast control channel (MCCH) and a multicast traffic channel (MTCH) which are logical channels of a media access control (MAC) layer. The MTCH is a point-to-multipoint downlink channel for traffic data transmitted from a network to a terminal. Also, the MCCH is a point-to-multipoint downlink channel used for MBMS control information transmitted from a network to a terminal for the sake of at least one MTCH. An MCCH and MTCH are only used by a terminal receiving an MBMS.

A specific pattern of subframes is allocated for transmission of a specific MCH, and referred to as an MCH subframe allocation pattern (MSAP). Here, the subframes are not necessarily adjacent in time. An MSAP for all MCHs including an MTCH is signaled in an MCCH. An MSAP occasion includes a set of subframes defined by an MSAP during a specific period. In such an MSAP occasion, a base station performs MAC multiplexing of several MTCHs and MCCHs selectively transmitted in the corresponding MCHs. The transmission sequence of the MTCHs is signaled in the MCCHs.

Meanwhile, a radio resource control (RRC) layer above the MAC layer performs a variety of control functions related to configuration, reconfiguration, and release of a lower layer in a terminal or network. To support several RRC procedures, related RRC messages are exchanged between a terminal and a network, and the RRC messages may include control messages conforming to a non-access stratum (NAS) protocol. These control messages are not read in a wireless access network but transferred to a terminal or a core network (CN) as they are.

Three types of RRC messages are used to transfer system information: a master information block (MIB) message, a system information block type 1 (SIB1) message, and an SI message. Here, system information is configured in the form of SIB, and each SIB includes a set of functionally-related parameters. According to characteristics, SIBs can be classified into an MIB including a limited number of most frequently transmitted parameters essential for a terminal's initial access to a network, an SIB1 including parameters required to determine whether the corresponding cell is appropriate for cell selection and information related to time domain scheduling of other SIBs, a system information block type 2 (SIB2) including common and shared channel information, and so on. Segmentation and concatenation of an SIB are performed in the RRC layer. Scheduling of transmission periods, methods, etc. is managed according to each group of SIBs having similar characteristics.

To distinguish an MBSFN subframe to be used for MBMS transmission, an LTE system defines a subframe allocation pattern (SAP) in SIB2s. An SAP is defined by an offset and a period, and in units of radio frames (RFs). Using at least one SAP, RFs to be used for MBSFN transmission are selected. After this, using a 6-bit bitmap or 24-bit bitmap, which is another piece of information of an SIB2, an MBSFN subframe is distinguished (SubframeAllocation). An MBSFN subframe determined at the current SIB2 level can be used for purposes other than an MBMS such as relaying and positioning.

Example embodiments of the present invention propose a method of configuring control information whereby a subframe to be used for an MBMS is efficiently distinguished from among MBSFN subframes determined using at least one SAP. Also, example embodiments of the present invention provide a method of determining allocation periods of MCHs in one MBSFN area.

A method according to example embodiments of the present invention makes use of information about a repeated RF pattern. More specifically, example embodiments of the present invention propose a method of allocating a subframe to be used for MBMS transmission with reference to RFs in which an SAP is repeated.

In other words, example embodiments of the present invention propose a method of configuring control information for setting an MBSFN subframe that one or more MCHs use in common from an MBSFN subframe setting transmitted as system information. In the method, a repeated allocation pattern (common subframe allocation (CSA) pattern) and a repetition period (CSA period) of MBSFN subframes that MCHs use in common constitute control information, and the control information is transmitted as system information or RRC control information of an MCCH, etc. Here, when a CSA pattern is defined over two RFs, a CSA period may be equal to four RFs (the CSA pattern is repeated two times), eight RFs (the CSA pattern is repeated four times), etc.

A CSA pattern can be determined with reference to, for example, the least common multiple or the minimum section in which an MBSFN SAP can be repeated. However, a CSA pattern can also be determined in other ways. In other words, a CSA pattern can be determined in the same manner as an MBSFN subframe is determined in an SIB2.

In an example embodiment of the present invention, a method of configuring control information for distinguishing a subframe for an MBMS from among MBSFN subframes consisting of at least one SAP makes use of the least common multiple of periods of SIB2 SAPs. Since periods of SIB2 SAPs have values of 1, 2, 4, 8, 16 and 32, the period of an SIB2 SAP having the largest value among SIB2 SAPs is used. For example, when there are SIB2 SAP 1 and SIB2 SAP 2, the period of SIB2 SAP 1 is 2, and the period of SIB2 SAP 2 is 8, the least common multiple is 8, and control information is configured at periods of 8. In another example embodiment, when there are the same minimum SAPs, information about as long a CSA period as the minimum SAPs and control information corresponding to the CSA period are only provided in RF units.

In an MBMS system, an MBSFN subframe is distinguished using a subframe allocation bitmap after an RF is determined according to SIB2 information. To distinguish a subframe to be used for an MBMS from among MBSFN subframes determined in this way, another bitmap is used. The length of a bitmap may be fixed or variable.

A variable indicating an RF allocation repetition pattern and a bitmap denoting subframe allocation can be transferred by an SIB2 or an SIB for an MBMS (SIB13) and MCCH information, respectively.

Meanwhile, an MBMS system to which example embodiments of the present invention can be applied may include a mobility management entity (MME), a multi-cell/multicast coordination entity (MCE), an MBMS gateway (GW), and a base station.

The MME is a control node which processes signaling between a user equipment (UE) and a CN.

The MCE is in charge of admission control and allocation of radio resources, which are used by all base stations in an MBSFN area for multi-cell MBMS transmission using an MBSFN operation, and participate in MBMS session control signaling.

The MCE according to an example embodiment of the present invention compares periods of respective SAPs in RF units to configure control information about at least one SAP for an MBMS, sets a unit section in which at least one SAP is repeated, and configures control information including information about a subframe allocated for the MBMS in the set unit section.

Also, the MCE according to another example embodiment sets a unit section in which at least one SAP is repeated for the sake of radio resource allocation having an allocation pattern repeated at predetermined periods. When the set unit section includes sub-unit sections sharing a predetermined allocation pattern, the MCE can separate the unit section into the respective sub-unit sections and configure control information including radio resource allocation information about the unit section and the sub-unit sections.

The MBMS GW serves to transmit or broadcast an MBMS packet to respective base stations receiving service.

A variety of example embodiments of the present invention will be described in detail below with reference to FIGS. 2 to 6.

Figure 2:
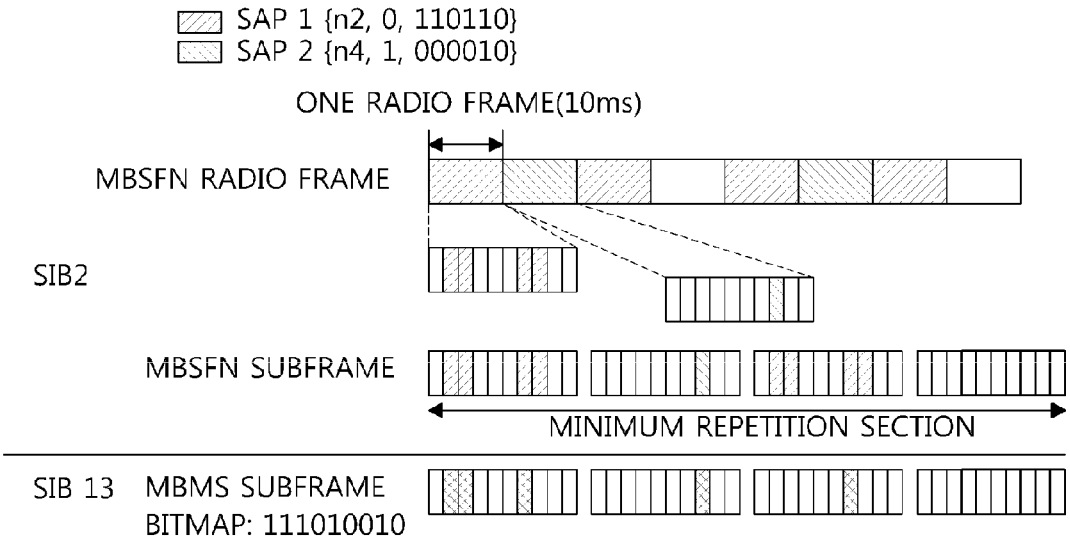
FIG. 2 illustrates a method of configuring control information according to example embodiments of the present invention when at least one resource allocation pattern is included.

FIG. 2 illustrates a method of configuring control information according to example embodiments of the present invention when at least one resource allocation pattern is included.

FIG. 2 illustrates an example embodiment of a method of distinguishing a subframe to be used for an MBMS using a bitmap when an RF allocation repetition pattern corresponds to the least common multiple.

In this example embodiment, a variable indicating an RF allocation repetition pattern and a bitmap are transferred by an SIB for an MBMS (e.g., an SIB13). In FIG. 2, two SIB2 SAPs are included in one unit section, and SIB2 SAP 1 has a period of 2, an offset of 0, and an SAP of "110110." Also, SIB2 SAP 2 has a period of 4, an offset of 1, and an SAP of "000010."

Here, the number of bits used for subframe allocation varies according to the number of subframes which can be allocated for MBSFN among all subframes in one RF. For example, in a 3GPP system based on a frequency division duplex (FDD) frame structure, subframes 0, 4, 5, and 9 among subframes 0 to 9 must be unicast for synchronization, paging, etc., and thus cannot be allocated as an MBSFN frame. In this case, only six of ten subframes constituting one RF excluding the four subframes can be allocated for MBSFN.

In the case of FIG. 2, a subframe for an MBMS is distinguished using a bitmap with reference to the period of SIB2 SAP 2, that is, 4 (i.e., the least common multiple of SIB2 SAP 1 and SIB2 SAP 2) according to an example embodiment of the present invention. When a total of nine MBSFN subframes are allocated to SIB1 and SIB2 and subframes allocated for an MBMS among the MBSFN subframes are as shown at the lower end of FIG. 2, a bitmap can be expressed as "111010010." Also, it can be seen that the bitmap is repeated every four RFs.

Figure 3:
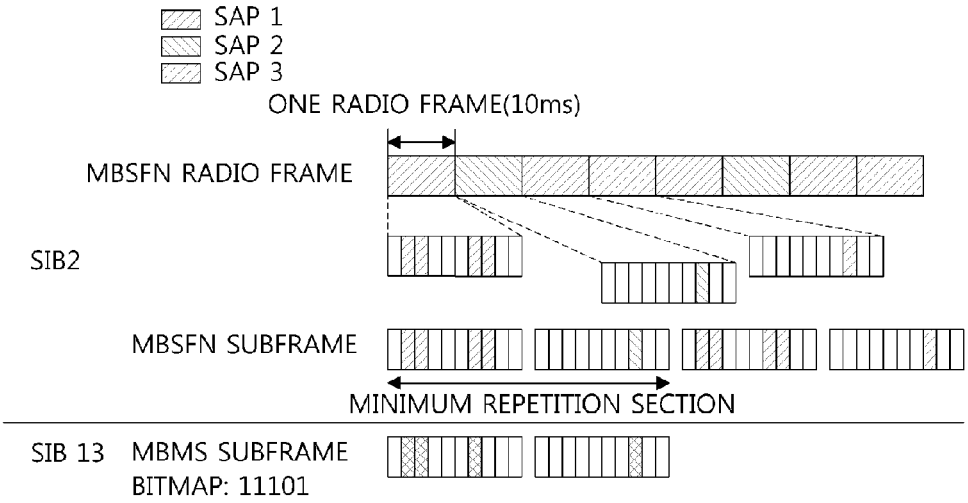
FIG. 3 illustrates a method of configuring control information according to other example embodiments of the present invention when at least one resource allocation pattern is included.

FIG. 3 illustrates a method of configuring control information according to other example embodiments of the present invention when at least one resource allocation pattern is included.

FIG. 3 illustrates an example embodiment of a method of distinguishing a subframe to be used for an MBMS using a bitmap when an RF allocation repetition pattern corresponding to a smaller unit than the least common multiple of SAP periods is detected. In this example embodiment, a variable indicating an RF allocation repetition pattern and a bitmap are transferred by an SIB for an MBMS (SIB 13).

In the example embodiment of FIG. 3, there are three SIB2 SAPs. SIB2 SAP 1 has a period of 2, an offset of 0, and a bitmap of "110110," SIB2 SAP 2 has a period of 4, an offset of 1, and a bitmap of "000010," and SIB2 SAP 3 has a period of 4, an offset of 3, and a bitmap of "000010." In this case, the least common multiple of the periods is 4, but the minimum repetition section is 2. Thus, two RFs are repeated in the structure. When subframes allocated for an MBMS among the RFs are as shown at the lower end of FIG. 3, a bitmap denoting the subframes for an MBMS can be expressed as "11101."

In brief, example embodiments of the present invention propose a method of distinguishing an MBSFN subframe for an MBMS using a bitmap in a section in which at least one SIB2 SAP is repeated. The section in which at least one SIB2 SAP is repeated may be the minimum section in which the same pattern is repeated, or a section in which the same pattern is repeated at the same periods as the least common multiple of periods of SIB2 SAPs. The corresponding control information may be transferred through an SIB2, an SIB for an MBMS, or an MCCH, or may be divided into three pieces and transferred.

Also, the repetition section of SIB2 SAPs can be specified in the control information and transferred, or implicitly transferred. According to the explicit method, information indicating that a repetition section is 4 is transferred in an SIB for an MBMS together with a bitmap in the example of FIG. 2, and information indicating that a repetition section is 2 is transferred in an SIB for an MBMS together with a bitmap in the example of FIG. 3.

As mentioned above, a bitmap is used for distinguishing a subframe from MBSFN subframes determined in an SIB2, and thus may be used for all RFs. In the above-mentioned method, a delta bitmap mainly used for subframes extracted from SIB2 SAPs is applied, but a bitmap may be configured for all subframes. For example, in FIG. 2, a bitmap can be expressed as <110110 000010 110110 000000>.

The length of a bitmap may vary. Also, a bitmap may consist of one bit string in a hierarchical structure. For convenience, a bitmap having a hierarchical structure is referred to as a bitmap set (or bitmap pool) in example embodiments of the present invention. A bitmap set can be a bit string including information (upper bitmap) about types of a plurality of bitmaps and which bitmap type is used in the corresponding section, and bit string information (lower bitmap) about the respective types. This will be described in further detail in example embodiments below. Also, a bitmap may consist of a bit string of a repetition section corresponding to the least common multiple of periods of SIB2 SAPs or a repetition section irrelevant to the SIB2 SAPs.

Another example embodiment of the present invention proposes a method of configuring a bitmap using a period of a positioning subframe as a method of configuring a bitmap indicating a subframe to be used for an MBMS. One of reserved MBSFN subframes defined as an SIB2 SAP can be used for positioning at periods of 16, 32, 64 and 128 RFs.

In an example embodiment of the present invention, when there is no SAP having a period of 32 among SIB2 SAPs, one bitmap is configured with reference to 16 RFs, which correspond to the minimum repetition period of a positioning subframe. Using a bitmap for extracting an MBMS subframe from among 16 RFs, an MBMS subframe in a multicast SAP (an MSAP occasion or pmch-SubframeAllocPeriod) is indicated. In other words, subframes to be used as MBMS subframes among 96 subframes which may be used as MBSFN subframes are indicated by 96 bitmaps or as many bitmaps as the number of MBSFN subframes assigned in an SIB2 SAP, and a UE is implicitly informed of a difference of one subframe between a case in which there is a positioning subframe and a case in which there is no positioning subframe.

Figure 4:
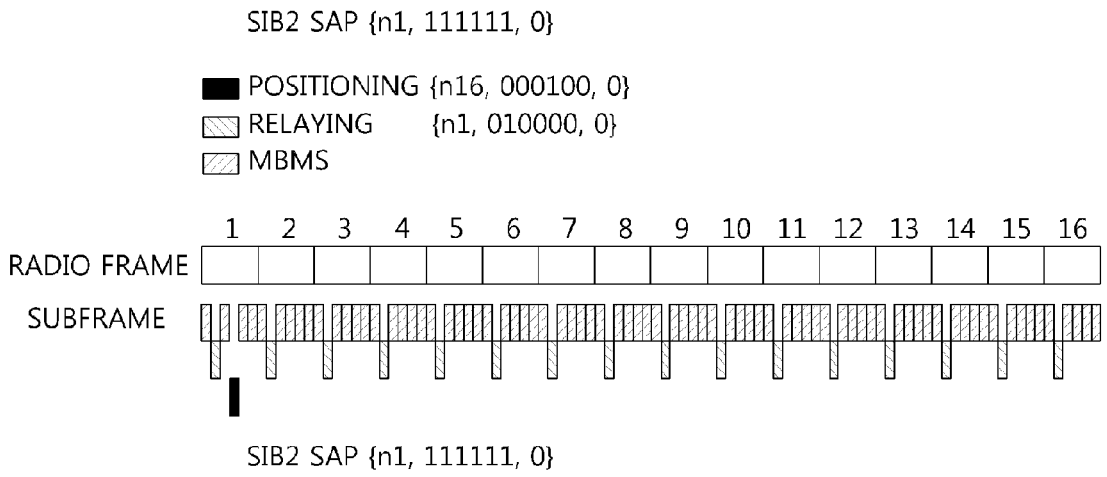
FIG. 4 illustrates a method of configuring control information according to example embodiments of the present invention when positioning and relaying are taken into consideration together.

FIG. 4 illustrates a method of configuring control information according to example embodiments of the present invention when positioning and relaying are taken into consideration together.

FIG. 4 illustrates a case in which both of positioning and relaying are taken into consideration. In FIG. 4, a positioning subframe has a period of 16, a bitmap of "000100," and an offset of 0, and a relaying subframe has a period of 1, a bitmap of "010000," and an offset of 0. It is assumed in an SIB2 SAP that all MBSFN subframes have a period of 1, a bitmap of "111111," and an offset of 0, and all subframes not for positioning or relaying are used by an MBMS. In the case of FIG. 4, a bitmap, that is, allocation control information, is "101011 101111 101111 101111 101111 101111 101111 101111 101111 101111 101111 101111 101111 101111 101111 101111 101111 101111."

Figure 5:
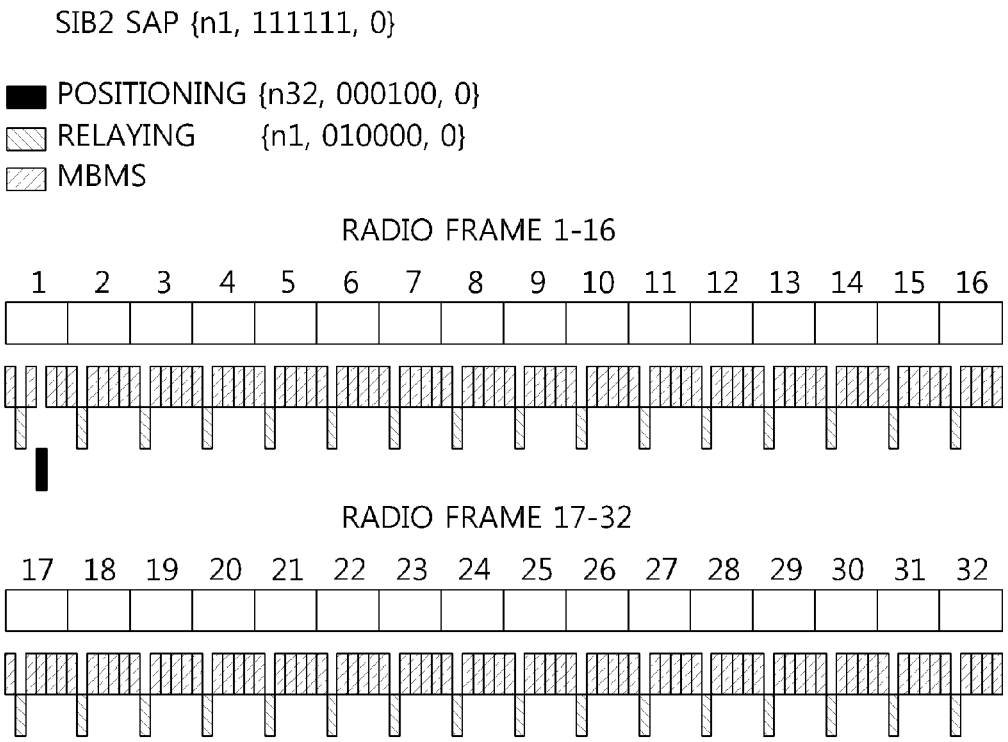
FIG. 5 illustrates a method of configuring control information according to other example embodiments of the present invention when positioning and relaying are taken into consideration together.

FIG. 5 illustrates a method of configuring control information according to other example embodiments of the present invention when positioning and relaying are taken into consideration together.

FIG. 5 illustrates a case having a longer positioning period than the case of FIG. 4. When a positioning period is 32 or more as shown in FIG. 5, a bitmap of RF 1 to RF 16 is the same as that of FIG. 4. However, RF 17 to RF 32 do not include a positioning subframe, and thus have a different allocation pattern than RF 1 to RF 16. In other words, a bitmap to be applied to RF 17 differs from a bitmap to be applied to RF 1. Here, according to an example embodiment of the present invention, one bitmap is configured for 16 RFs such as "101011 101111 101111 101111 101111 101111 101111 101111 101111 101111 101111 101111 101111 101111 101111 101111 101111 101111 101111" used in FIG. 4, and control information including additional information indicating that a fourth MBSFN subframe of RF 17 is available is configured and transferred.

Meanwhile, when a positioning period is 64, RF 1 to RF 16 have a positioning subframe, but RF 17 to RF 32, RF 33 to RF 48, and RF 49 to RF 64 have no positioning subframe. Here, additional information indicating that RF 1 to RF 16 are different from RF 17 to RF 32, RF 33 to RF 48, and RF 49 to RF 64 is provided to denote whether or not a subframe is used. For example, additional information such as a bit string "1000" indicating whether or not a positioning subframe is present is provided with a bitmap denoting subframe allocation, thereby indicating that one subframe is empty among only the first set of 16 RFs.

In a more simplified method, a subframe can be emptied to be used for positioning at periods of 16 RFs regardless of positioning repetition periods of 16, 32, 64, and 128.

The above-described control information transfer method in which the same pattern is used in the minimum repetition period or the minimum section can be used together with the control information configuration method in which control information is configured in consideration of positioning to include a bitmap and additional information.

Figure 6:
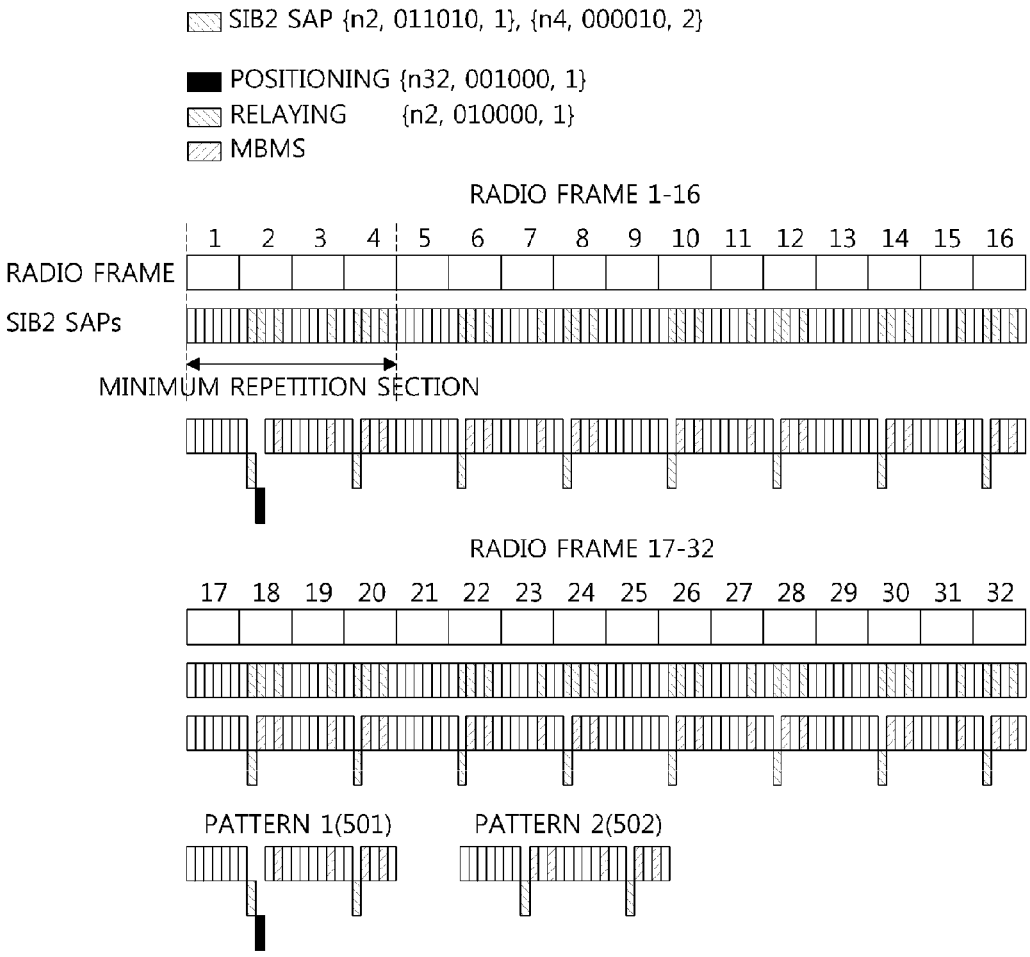
FIG. 6 illustrates a method of configuring control information according to example embodiments of the present invention when two types of patterns repeated according to whether or not a positioning subframe is included are included.

In this information transfer method, that is, a hierarchical information transfer method, the length of the minimum repetition period and information about the corresponding bitmaps are transferred first. After this, the method further constitutes another bitmap including information on how a bitmap of the minimum repetition period is configured in a longer section, and the length of the other bitmap is transferred by control information. Here, the length of the minimum repetition period, the bitmap, a valid section of the bitmap, and the length of the other bitmap according to the valid section are not limited. FIG. 6 illustrating an example embodiment of the hierarchical control information configuration method will be described in detail later.

All variables used in the above-described example embodiment may be fixed or vary. Alternatively, some of the variables may be fixed, but the other variables may vary. Also, a bitmap may be applied to entire subframes or only subframes selected in an SIB2.

FIG. 6 illustrates a method of configuring control information according to example embodiments of the present invention when two types of patterns repeated according to whether or not a positioning subframe is included are included.

FIG. 6 illustrates one unit section including 32 RFs overall. The one unit section shown in FIG. 6 includes SAP 1 having a period of 2, an offset of 1, and an allocation pattern of "011010," and SAP 2 having a period of 4, an offset of 2, and an allocation pattern of "000010". Also, a positioning allocation pattern has a period of 32, an offset of 1, and an allocation pattern of "001000," and a relaying allocation pattern has having a period of 2, an offset of 1, and an allocation pattern of "010000." An allocation pattern of FIG. 6 defined for all the RFs can be expressed as "0011011 0111011 0011011 0011011 0011011 0011011 0011011 0011011."

Here, all the 32 RFs of FIG. 6 can be classified into two types of sub-unit sections each including four RFs. Among the sub-units, sub-units other than a sub-unit including the foremost four RFs have the same SAP.

Thus, in an example embodiment of the present invention illustrated in FIG. 6, control information about an allocation pattern for all RFs included in one unit section is not configured, but control information is configured in a hierarchical structure including information (e.g., an upper bitmap) about types of sub-unit sections, and information (e.g., lower bitmap) about allocation patterns in the respective sub-unit sections.

The method will be described in detail below with reference to FIG. 6.

Pattern 1 501 indicates a resource allocation pattern including a positioning subframe, and pattern 2 502 indicates a resource allocation pattern without a positioning subframe. In this case, an upper bitmap for indicating that one sub-unit section is pattern 1 or pattern 2 can be set to, for example, "1000" for pattern 1 and "0000" for pattern 2. Also, a lower bitmap can be set to "0011011" for pattern 1 including a positioning subframe and "0111011" for pattern 2 without a positioning subframe.

When bit strings having a fixed length are used, the length of the bit strings, the number of repeated patterns, etc. have been determined already and thus may not constitute additional control information.

In another example embodiment of the present invention, a bitmap for entire multicast SAPs or a delta bitmap is used when a multicast SAP (an MSAP occasion or pmch-SubframeAllocPeriod) is short, and the above-described method of using a bitmap of a repeated section is used when the multicast SAP is long. A multicast SAP whereby the two cases are classified can be 10, 40, 80, 160, 320, 640, 1280, 2560, 5120, and 10240 msec. For example, a bitmap for all multicast SAPs is used when a multicast SAP is 160 msec or less, and a repeated bitmap is used when the multicast SAP exceeds 160 msec.

Also, since an MCCH cannot be changed before a change period, a bitmap for indicating MCH subframe allocation control information or control information provides as much MBMS subframe allocation information as the sum of a plurality of multicast SAPs.

As an example, 128 RFs are expressed by bitmaps or delta bitmaps of about 16 RFs. In other words, when one or more MCHs are present, common MBSFN allocation control information (CSA) for an MBMS is set in consideration of all MCHs, and then control information (MCH subframe allocation (MSA)) for allocating MBSFN subframes to the respective MCHs can be set separately from the common MBSFN allocation control information for an MBMS.

At this time, to allocate MBSFN subframes to the respective MCHs according to the common MBSFN allocation control information for an MBMS, control information, such as lengths of subframes allocated to the respective MCHs or end positions in the time axis (sf-AllocEnd-r9 which indicates end positions of MCH-specific subframes and can be implemented in the form of an RRC message), can be used. In particular, when end positions are used, it is possible to set an MBSFN subframe at which subframe allocation for a specific MCH is finished using an integer such as an index indicating a position of the subframe to indicate an end position at the MBSFN subframe set according to the common MBSFN allocation control information for an MBMS.

A method of configuring a subframe for an MBMS according to example embodiments of the present invention can be applied to a subframe arrangement method in which a relatively short regular pattern is repeated. The short regular pattern can correspond to 10, 20, 40, 80, 160, or 320 subframes.

Here, when a bitmap corresponding to a fixed length is used, the length can be 10, 20, 40, 80, 160, 320, 640, or 1280 subframes, or 6, 12, 24, 48, 96, 192, 384, or 768 subframes.

Also, in example embodiments of the present invention, the minimum repetition section of SIB2 SAPs or a multiple of the minimum repetition section of SIB2 SAPs can be used to determine a multicast SAP (an MSAP occasion or pmch-SubframeAllocPeriod) or MCH common allocation (MCA).

Using an apparatus and method for configuring control information according to example embodiments of the present invention, it is possible to efficiently distinguish an MBSFN subframe for an MBMS.

While the example embodiments of the present invention and their advantages have been described in detail, it should be understood that various changes, substitutions and alterations may be made herein without departing from the scope of the invention.

The invention claimed is:

1. A *communication* method [of configuring control information for more than one subframe allocation pattern (SAP) for a multimedia broadcast/multicast service (MBMS)], comprising:

[determining subframes that can be allocated to the MBMS in units of at least one radio frame (RF);]

[comparing, in RF units, periods of respective allocation patterns of subframes actually allocated to the MBMS among the subframes that can be allocated to the MBMS, so as to set a common subframe allocation period in which the more than one SAP is repeated; and]

[configuring control information including information about at least one subframe allocated for the MBMS in the common subframe allocation period,]

*generating first control information;*

*generating second control information;*

*generating third control information; and*

*broadcasting multimedia broadcast/multicast services (MBMSs) based on the first, second and third control information,* wherein the *first* control information [includes upper control information about at least one subframe that can be allocated to the MBMS in the common subframe allocation period], *comprises a first bitmap which indicates a first set of multicast broadcast single frequency network (MBSFN) subframes*and [lower] *the second* control information [including information about at least one subframe] *comprises a second bitmap which indicates a second set of MBSFN subframes that are* allocated to [at least one] multicast [channel] *channels* (MCH*s*) for the MBMS *s*,

[wherein the lower control information includes information about the position of the last subframe allocated to each MCH as information used for classifying the MCH]

*wherein the third control information indicates a last subframe allocated to an MCH.*

[2. The method of claim 1, wherein at least one of the upper control information and the lower control information is presented as a bitmap indicating a corresponding subframe.]

[3. The method of claim 1, wherein the subframes that can be allocated to the MBMS are a multicast broadcast single frequency network (MBSFN) subframe.]

4. The method of claim 1, wherein [the common subframe allocation period in which the more than one SAP is repeated is set to a minimum period in which more than one SAP for more than one multicast channel (MCH) is repeated] *the first set of MBSFN subframes comprises a plurality of MBSFN subframes for an MBMS, and the plurality of MBSFN subframes for the MBMS are disposed based on a subframe allocation pattern (SAP).*

5. The method of claim 1, wherein *a number of* the [number of] *first set of MBSFN* subframes [that can be allocated to the MBMS] is six based on a frequency division duplex (FDD) structure.

[6. A method of receiving multimedia broadcast/multicast data, comprising:

receiving control information about radio resource allocation for a multimedia broadcast/multicast service (MBMS) from at least one base station; and receiving multimedia broadcast/multicast data using radio resources indicated by the control information, wherein the control information about the radio resource allocation for the MBMS includes information about at least one subframe allocated for the MBMS in a common subframe allocation period, in which more than one subframe allocation pattern (SAP) actually allocated to the MBMS is repeated, among subframes that can be allocated to the MBMS, wherein the control information includes upper control information about at least one subframe that can be allocated to the MBMS in the common subframe allocation period, and lower control information including information about at least one subframe allocated to at least one multicast channel (MCH) for the MBMS, wherein the lower control information includes information about the position of the last subframe allocated to each MCH as information used for classifying the MCH.]

[7. The method of claim 6, wherein at least one of the upper control information and the lower control information is presented as a bitmap indicating a corresponding subframe.]

[8. The method of claim 6, wherein the subframes that can be allocated to the MBMS are a multicast broadcast single frequency network (MBSFN) subframe.]

[9. The method of claim 6, wherein the common subframe allocation period in which the more than one SAP is repeated is set to a minimum period in which more than one SAP for more than one multicast channel (MCH) is repeated.]

[10. The method of claim 6, wherein the number of subframes that can be allocated to the MBMS is six based on a frequency division duplex (FDD) structure.]

[11. A method of transmitting MBMS data, the method comprising:

transmitting first control information indicating MBSFN subframes among a plurality of subframes;

transmitting second control information indicating MBMS subframes among the MBSFN subframes; and transmitting first MBMS data and second MBMS data using the MBMS subframes, wherein the second control information includes resource allocation period common for the first MBMS data and the second MBMS data, and the second control information includes a first resource allocation pattern repeated by M times during the resource allocation period, and a second resource allocation pattern repeated by N times during the resource allocation period, where M and N are natural numbers, wherein the second control information further includes third control information on the last MBMS subframe allocated to the first MBMS data during MBMS subframes included in the resource allocation period, and fourth control information on the last MBMS subframe allocated to the second MBMS data during MBMS subframes included in the resource allocation period, wherein the M is determined by period and offset of the first resource allocation pattern, and the N is determined by period and offset of the second resource allocation pattern.]

[12. A method of receiving MBMS data, the method comprising:

receiving first control information indicating MBSFN subframes among a plurality of subframes;

receiving second control information indicating MBMS subframes among the MBSFN subframes; and receiving first MBMS data and second MBMS data using the MBMS subframes, wherein the second control information includes resource allocation period common for the first MBMS data and the second MBMS data, and the second control information includes a first resource allocation pattern repeated by M times during the resource allocation period, and a second resource allocation pattern repeated by N times during the resource allocation period, where M and N are natural numbers, wherein the second control information further includes third control information on the last MBMS subframe allocated to the first MBMS data during MBMS subframes included in the resource allocation period, and fourth control information on the last MBMS subframe allocated to the second MBMS data during MBMS subframes included in the resource allocation period, wherein the M is determined by period and offset of the first resource allocation pattern, and the N is determined by period and offset of the second resource allocation pattern.]

*13. The method of claim 4, wherein transmission of the MBMS is terminated at the last subframe among the second set of MBSFN subframes at which subframe allocation for the MCH is finished.*

*14. A communication method, comprising:*

*obtaining first control information;*

*obtaining second control information;*

*obtaining third control information; and*

*receiving one of multimedia broadcast/multicast services (MBMSs) broadcasted from a base station based on the first, second and third control information,*

*wherein the first control information comprises a first bitmap which indicates a first set of multicast broadcast single frequency network (MBSFN) subframes, and the second control information comprises a second bitmap which indicates a second set of MBSFN subframes that are allocated to multicast channels (MCHs) for the MBMSs,*

*wherein the third control information indicates a last subframe allocated to an MCH.*

*15. The method of claim 14, wherein the first set of MBSFN subframes comprise a plurality of MBSFN subframes for an MBMS, and the plurality of MBSFN subframes for the MBMS are disposed based on a subframe allocation pattern (SAP).*

*16. The method of claim 15, wherein transmission of the MBMS is terminated at the last subframe among the second set of MBSFN subframes at which subframe allocation for the MCH is finished.*

*17. The method of claim 14, wherein a number of the first set of MBSFN subframes is six based on a frequency division duplex (FDD) structure.*

*18. A communication apparatus, comprising:*

*a memory; and*

*a processor,*

*wherein the processor, when executing program instructions stored in the memory, is configured to:*

*cause the communication apparatus to generate first control information;*

*cause the communication apparatus to generate second control information;*

*cause the communication apparatus to generate third control information; and*

*cause the communication apparatus to broadcast multimedia broadcast/multicast services (MBMSs) based on the first, second and third control information,*

*wherein the first control information comprises a first bitmap which indicates a first set of multicast broadcast single frequency network (MBSFN) subframes, and the second control information comprises a second bitmap which indicates a second set of MBSFN subframes that are allocated to multicast channels (MCHs) for the MBMSs,*

*wherein the third control information further indicates a last subframe allocated to an MCH.*

*19. The communication apparatus of claim 18, wherein the first set of MBSFN subframes comprises a plurality of MBSFN subframes for an MBMS, and the plurality of MBSFN subframes for the MBMS are disposed based on a subframe allocation pattern (SAP).*

*20. The apparatus of claim 19, wherein transmission of the MBMS is terminated at the last subframe among the second set of MBSFN subframes at which subframe allocation for the MCH is finished.*

*21. The communication apparatus of claim 18, wherein a number of the first set of MBSFN subframes is six based on a frequency division duplex (FDD) structure.*

*22. A communication apparatus, comprising:*

*a memory; and*

*a processor,*

*wherein the processor, when executing program instructions stored in the memory, is configured to:*

*cause the communication apparatus to obtain first control information;*

*cause the communication apparatus to obtain second control information;*

*cause the communication apparatus to obtain third control information; and*

*cause the communication apparatus to receive one of multimedia broadcast/multicast services (MBMSs) broadcasted from a base station based on the first, second and third control information,*

*wherein the first control information comprises a first bitmap which indicates a first set of multicast broadcast single frequency network (MBSFN) subframes, and the second control information comprises a second bitmap which indicates a second set of MBSFN subframes that are allocated to a multicast channels (MCHs) for the MBMSs,*

*wherein the third control information indicates a last subframe allocated to an MCH.*

*23. The communication apparatus of claim 22, wherein the first set of MBSFN subframes comprise a plurality of MBSFN subframes for an MBMS, and the plurality of MBSFN subframes for the MBMS are disposed based on a subframe allocation pattern (SAP).*

*24. The apparatus of claim 23, wherein transmission of the MBMS is terminated at the last subframe among the second set of MBSFN subframes at which subframe allocation for the MCH is finished.*

*25. The communication apparatus of claim 22, wherein a number of the first set of MBSFN subframes is six based on a frequency division duplex (FDD) structure.*

* * * * *